United States Patent
Hotchkies et al.

(10) Patent No.: US 9,842,162 B1
(45) Date of Patent: Dec. 12, 2017

(54) NAVIGATING A TAXONOMY USING SEARCH QUERIES

(75) Inventors: Blair L. Hotchkies, Bellevue, WA (US); Brent Robert Mills, Seattle, WA (US); Jennica Jane Pounds, Bothell, WA (US); Sikandar Saifullah, Issaquah, WA (US); Alexandru I. Indrei, Seattle, WA (US); Jason P. Patrikios, Seattle, WA (US); Daniel R. Parshall, Redmond, WA (US); David Aaron Lichterman, Seattle, WA (US); Dan Catalin Teodorescu, Shoreline, WA (US); Sean P. Forde, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1822 days.

(21) Appl. No.: 12/698,235

(22) Filed: Feb. 2, 2010

(51) Int. Cl.
*G06F 17/30* (2006.01)

(52) U.S. Cl.
CPC .... *G06F 17/30737* (2013.01); *G06F 17/3061* (2013.01)

(58) Field of Classification Search
USPC ............................... 707/706, 713, 721, 723
See application file for complete search history.

(56) References Cited

U.S. PATENT DOCUMENTS

| | | | |
|---|---|---|---|
| 8,700,652 B2 * | 4/2014 | Agarwal | G06F 17/30737 707/765 |
| 2006/0259467 A1 * | 11/2006 | Westphal | 707/3 |
| 2008/0243637 A1 * | 10/2008 | Chan | G06Q 30/02 705/26.1 |
| 2009/0319272 A1 * | 12/2009 | Coulomb | G06Q 30/0603 704/251 |

\* cited by examiner

*Primary Examiner* — Amresh Singh
(74) *Attorney, Agent, or Firm* — Thomas | Horstemeyer, LLP

(57) ABSTRACT

Disclosed are various embodiments for navigating a taxonomy using search queries. An unstructured search query is parsed in order to identify one or more categories of a taxonomy of a collection of items. Each one of the one or more categories is associated with a confidence score. When the confidence score meets a threshold, a pool of items is selected from a respective one of the one or more categories. When no confidence score meets the threshold, the pool of items is selected from the collection of items.

21 Claims, 7 Drawing Sheets

NAVIGATING A TAXONOMY USING SEARCH QUERIES

BACKGROUND

Item search engines may be provided by network sites for users to locate items within a collection of items. Typically, a user submits a search query to the item search engine, and the item search engine compares the search query with one or more text fields associated with the item, such as title, description, etc. Alternatively, a network site may provide a navigational menu for users to browse items associated with specific categories within a taxonomy of items. When the user selects a category, items and/or subcategories associated with the category may be shown.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
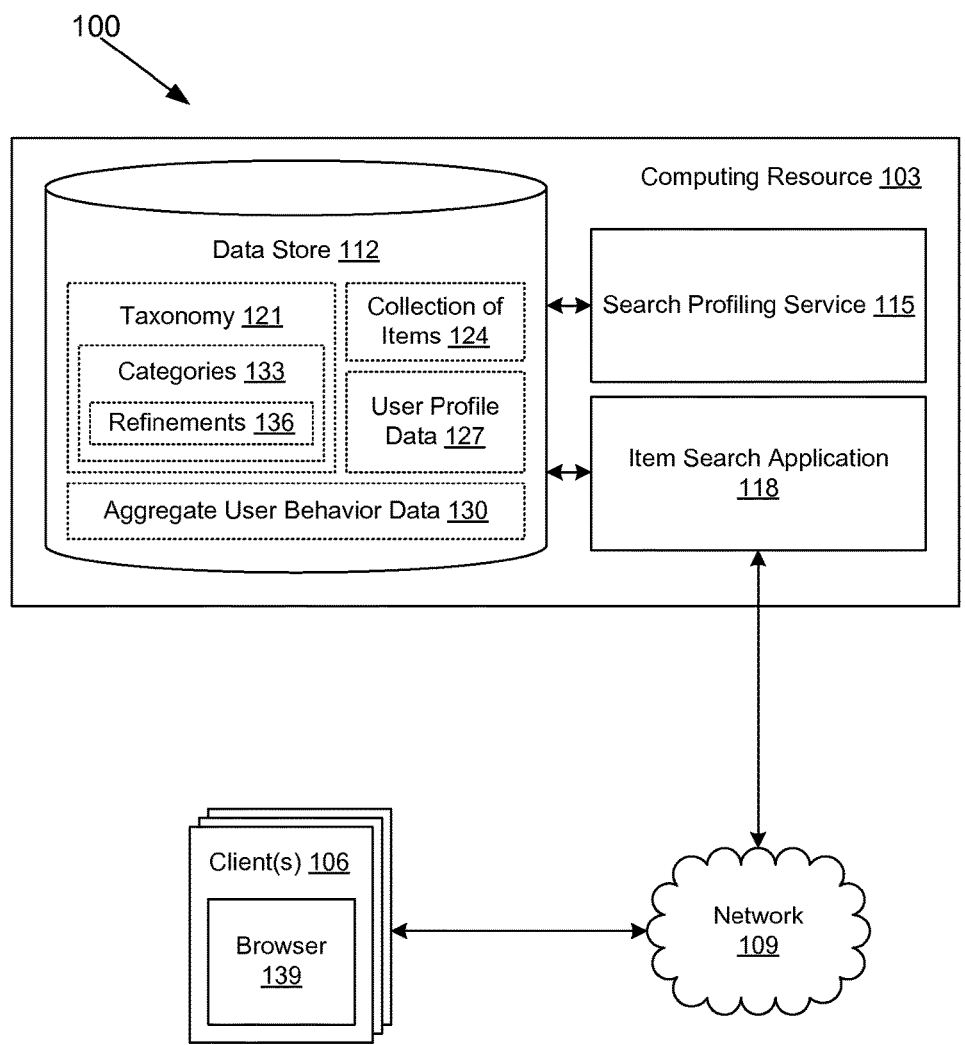
FIG. 1 is a drawing of a networked environment according to various embodiments of the present disclosure.

A taxonomy is a hierarchical organization of a collection of items such as, for example, products from a catalog of products. Network sites typically provide graphical menus for users to navigate through a taxonomy. To locate an item in a taxonomy, a user may click on a broad category from a graphical menu and then drill down to more specific subcategories. However, some users, especially those who have low domain knowledge or those who frequently use keyword-only search interfaces, may prefer to search for an item by entering one or more keywords into an item search engine. Unfortunately, item search engines will typically search through an entire collection of items in order to match the search query of the user, thereby producing search results that may be less relevant. As a non-limiting example, a user may intend to search for products within apparel by entering "jackets" into a product search engine, but the search results may include books, sunglasses, and other products that are irrelevant to the user.

In addition to providing search results that may be less relevant, a search query executed in an entire catalog of products may result, for example, in cell phones being displayed next to books, which are in turn displayed next to sweaters. This diverse array of results may lead to a diminished search experience. As a non-limiting example, an online retailer may customize search results for apparel items in order to provide a much more engaging, visual search experience. As another non-limiting example, the online retailer may customize search results for a book category to display giant book covers.

Moreover, different categories may be associated with different options for items, or refinements. While apparel items may have options such as, for example, size, color, fabric type, and other specific refinements, book items may have an entirely different set of refinements such as, for example, large or small print, paperback or hardcover, printed or audio book, and so on. Although such options may be configured or selected by the user when browsing a taxonomy, an ordinary text-based search may misinterpret keywords that are intended to be refinements.

Various embodiments of the present disclosure allow users to navigate a taxonomy using search queries. In other words, various embodiments of the present disclosure seek to translate words from a search query into what otherwise would be mouse clicks used in navigating a menu-driven taxonomy. To this end, a search query may be parsed into keywords or terms that may be identified to categories, refinements, or neither. Depending on a confidence level of the system regarding mapping the search query to a category, an item search may be executed within only that category from the taxonomy, or the user may be prompted to confirm which category was intended by the search query. In the following discussion, a general description of the system and its components is provided, followed by a discussion of the operation of the same.

With reference to FIG. 1, shown is a networked environment 100 according to various embodiments. The networked environment 100 includes a computing resource 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing resource 103 may comprise, for example, a server computer or any other computing device or system providing computing capability. The computing resource 103 may represent multiple computer systems arranged, for example, in one or more server banks or other arrangements. To this end, the computing resource 103 may comprise, for example, a cloud computing resource, a grid computing resource, and/or any other distributed computing arrangement. Such computer systems may be located in a single installation or may be dispersed among many different geographical locations. In one embodiment, the computing resource 103 represents a virtualized computer system executing on one or more physical computing systems. For purposes of convenience, the computing resource 103 is referred to herein in the singular. However, in one embodiment, the computing resource 103 represents a plurality of computer systems arranged as described above.

Various applications and/or other functionality may be executed in the computing resource 103 according to various embodiments. Also, various data is stored in a data store 112 that is accessible to the computing resource 103. The data store 112 may be representative of a plurality of data stores as can be appreciated. The data stored in the data store 112, for example, is associated with the operation of the various applications and/or functional entities described below.

The components executed on the computing resource 103, for example, include a search profiling service 115, an item search application 118, and other applications, services, processes, systems, engines, or functionality not discussed in detail herein. The search profiling service 115 is executed to analyze logs and/or other recorded data in order to produce parameters that may be used in generating confidence scores associated with the intent behind a given search query. The item search application 118 is executed to obtain a search query and generate a network page containing search results that are predicted to be relevant to the search query.

The data stored in the data store 112 includes, for example, a taxonomy 121, a collection of items 124, user profile data 127, aggregate user behavior data 130, and potentially other data. The taxonomy 121 represents a hierarchical organization of the collection of items 124. The taxonomy 121 may be organized into categories 133. In one embodiment, the taxonomy 121 may comprise a tree data structure, with each category 133 being a node in the tree. Categories 133 may have one or more refinements 136 corresponding to specific characteristics of items in that category 133. In some embodiments, the refinements 136 may be indexed for each category 133 and otherwise accessible from a master table. In some embodiments, some refinements 136 may be applicable to more than one category 133 in the taxonomy 121. Further, some refinements 136 may be applicable to only one item.

The collection of items 124 includes data used to describe each one of a plurality of items such as, for example, item title, item description, item price, item quantity, item options, item number, item images, and/or other data. In one embodiment, the items from the collection of items 124 comprise products offered for sale by an online retailer. In other embodiments, the collection of items 124 may comprise services, advertisements, network pages, social networking profiles, search queries, keywords or phrases used in tagging, images, audio clips, video clips, digital content items, and/or other items.

User profile data 127 may include profiling data associated with specific users based, for example, on prior purchase history, searching history, page view history, demographic data, and/or other data related to specific users. The aggregate user behavior data 130 may include aggregate statistics determined from a multitude of users based on item demand, whether users purchased an item after searching for an item using a given search query, whether users purchased an item after viewing a detailed network page describing the item, and/or other statistics. The aggregate user behavior data 130 may be generated on demand or periodically by the search profiling service 115.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 139 and/or other applications. The browser 139 may be executed in a client 106, for example, to access and render network pages, such as web pages, or other network content served up by the computing resource 103 and/or other servers. The client 106 may be configured to execute applications beyond browser 139 such as, for example, email applications, instant message applications, and/or other applications.

Next, a general description of the operation of the various components of the networked environment 100 is provided.

To begin, the item search application 118 obtains an unstructured search query from a client 106. The unstructured search query is a character string that may contain one or more keywords or search terms. The unstructured search query may comprise a phrase, a question, and/or any other character string. In some embodiments, the user may download a network page containing a search form through the browser 139 from the computing resource 103. The search form may include a field such as a text box for the user to enter the search query.

In some embodiments, the user may be able to select a category 133. When a category 133 is selected by the user, the search is performed relative to the selected category 133. When no specific category 133 is selected by the user or if a default category 133 (e.g., "all categories") is selected, the search is performed relative to all items within a collection of items 124 on the computing resource 103 and associated with the network site accessed by the user at the client 106.

Once the search query is obtained, the item search application 118 parses the search query in order to identify one or more categories 133, one or more refinements 136, and/or other keywords. The parsing may involve tokenizing the search query, i.e., identifying keywords separated by whitespace and/or other delimiters. In some embodiments, the item search application 118 may identify search terms spanning multiple words and including whitespace.

As a non-limiting example, a search query "long-strap red handbags" may be parsed into keywords identified with a category 133 ("handbags"), keywords identified with a refinement 136 (the color "red"), and other keywords ("long-strap"). The category 133 keyword(s) may be matched to a title of a specific category 133 (e.g., handbags) or to other data associated with a category 133 (e.g., "handbags" may match metadata or items from women's accessories, resulting in an identification of the "women's accessories" category 133).

The item search application 118 may identify refinements 136 independently of the identified categories 133 or based at least in part on the identified categories 133. As a non-limiting example, the category 133 "handbags" may have a particular list of refinements 136, which may be formed of attributes and values. "Color" may be one attribute, having a possible value of "red." As another non-limiting example, the taxonomy 121 or collection of items 124 may have a global set of refinements 136 from which the keywords may be matched.

Additionally, the item search application 118 may be configured to translate one refinement 136 keyword into both an attribute and a value. In some embodiments, the value portion of the refinement 136 may comprise a range of values.

The keywords that are mapped to categories 133 and refinements 136 may be used in matching data to produce search results as well as selecting search results. As a non-limiting example, "long-strap red handbags" may select all items from the identified category 133, "women's accessories," that have the color attribute "red" and contain textual data matching "handbags" and "long-strap." Various relevance ranking approaches may be employed to rank the selected items by the quality of the match. For instance, a match within an item title may be more relevant than a match within an item description in one embodiment.

Multiple categories 133 may be identified from the same keywords in a search query. As a non-limiting example, for the search query "jackets," the item search application 118 may identify the categories 133 of apparel, books, music, and sporting goods. In various embodiments, the item search application 118 may select items from one of the identified categories 133 or from more than one of the identified categories 133.

The item search application 118 may be configured to generate a confidence score for each of the identified categories 133 based at least in part on a matching of at least a portion of the search query with data associated with the respective identified category 133. As a non-limiting example, the item search application 118 may compare a search term identified with a category 133 from the search query with a description of the category 133, and the confidence score may be based at least in part on the match quality. As a non-limiting example, keywords found earlier in a description or multiple times in a description may result in a higher confidence score. Such matching may be performed on data describing subcategories of the category 133 or items associated with the category 133.

The confidence score for an identified category 133 may also be based at least in part on user profile data 127, aggregate user behavior data 130, and/or other data. As a non-limiting example, the category 133 of apparel identified for the search term "jacket" may be associated with a higher confidence score when the user searching for "jacket" has ordered apparel in the past or has recently viewed items in the apparel category 133. Further, the confidence score may be higher when the aggregate user behavior data 130 indicates that jackets in apparel are in greater demand, are in season, and/or are currently being searched for on the network site. In various embodiments, the user profile data 127 and aggregate user behavior data 130 may be compiled asynchronously relative to the item search by the search profiling service 115 and/or some other service.

Additionally, the confidence score for an identified category 133 may be based at least in part on an identification of a refinement 136 within the search query when the refinement 136 is associated with a respective identified category 133. As a non-limiting example, when a category 133 of apparel is identified, a relatively high confidence score may be assigned to that category 133 identification when a color refinement 136 or a size refinement 136 is present in the search query. Such refinements 136 may be specific to apparel so that a higher confidence score may be generated for apparel than for other possible categories 133 that have been identified from the search query. By contrast, the search term "comfortable" may be applicable to multiple categories 133 and may not result in a higher confidence score for the apparel category 133.

The item search application 118 may retrieve all the refinements 136 associated with an identified category 133, and then perform a text-based matching against keywords and/or other data associated with refinements 136. The quality of this matching, as determined by a relevance approach, may factor into the confidence score associated with the identified category 133. Additionally, the item search application 118 may perform spelling correction and may match keywords that are synonyms. As a non-limiting example, an item or category 133 may be associated with a refinement 136 that is an item attribute of color which may take the value of "maroon." In various embodiments, the item search application 118 may be configured to translate the keyword "red" into "maroon."

Furthermore, the item search application 118 may be configured to translate subjective keywords into refinements 136. In other words, the item search application 118 may be configured to translate one or more keywords into criteria for selecting items from the identified category 133. As a non-limiting example, the item search application 118 may be configured to translate the keyword "cheap" into a price refinement 136 with an item selection criterion of items having a price less than $100. As another non-limiting example, the item search application 118 may be configured to translate the keyword "stylish" into a price refinement 136 with an item selection criterion of the item price being greater than $300. As another non-limiting example, the item search application 118 may be configured to translate the search term "on sale" into a discount refinement 136 with an item selection criterion of the item discount being greater than 50%. Such translations and/or values may be configured on a per category 133 basis.

In some instances, the item search application 118 may identify multiple mutually exclusive categories 133 having no subcategory relationship. A first keyword associated with one identified category 133 may be associated with a refinement 136 for another identified category 133 that had been identified through a second keyword. As a non-limiting example, "orange" may be identified as a category 133 (e.g., fruit) and as a refinement 136 (e.g., color). The item search application 118 may decide which of the identified categories 133 is most likely intended by the user according to the respective confidence score.

In various embodiments, confidence scores may be calculated using a weighted combination of factors. As a non-limiting example, a confidence score s for a category 133 may be calculated according to the following equation: $s = C_1 \cdot a_1 + C_2 \cdot a_2 + C_3 \cdot a_3 + \ldots + C_n \cdot a_n$, where each $a_i$ is a numerical factor used in determining the confidence score and each $C_i$ is a constant weight applied to the respective $a_i$. As already discussed, sample factors may include quality of the text match of items in the category 133 with the search query, number of refinements 136 identified in the search query that are associated with the category 133, demand for items in the category 133, user behavior regarding the category 133 and the search query, and other factors. The factors used in computing confidence scores, for example, may naturally take numerical values or may be mapped to numerical scales. In some embodiments, confidence scores may also be generated for identified refinements 136 based on similar factors such as text match quality, demand for such a refinement 136, etc.

When a respective confidence score of an identified category 133 meets or exceeds a threshold, the item search application 118 may then select a pool of items associated with the respective category 133. In one embodiment, the pool of items may be selected from the respective category 133 only when no other identified category 133 has a confidence score meeting or exceeding the threshold. In some embodiments, when multiple confidence scores meet or exceed the threshold, an identified category 133 having a maximum one of the confidence scores may be used for the item search. In other embodiments, multiple identified categories 133 having confidence scores meeting or exceeding the threshold may be used for the item search. The pool of items may be selected based at least in part on a matching of text from the search query with text describing items from the respective category 133 in the taxonomy 121, as limited by any refinements 136 from the search query. In this case, the item search application 118 is highly confident in estimating the intent behind the search query and will limit the execution of the search.

When no confidence score associated with a possible category 133 meets or exceeds the threshold, or in some embodiments, when confidence scores associated with multiple categories 133 meet or exceed the threshold, the item search application 118 may be configured to select a pool of items from the entire collection of items 124 by matching the search query with text describing the respective items. In this case, the item search application 118 cannot confidently estimate the intent behind the search query and will execute the search as broadly as possible. In this way, the item search application 118 may effect a continuum from automatically limiting the scope of the item search and allowing the user to search more broadly afterward when the query intent is confidently ascertained, to maintaining a broad scope of the item search and asking permission to limit the scope afterward when the query intent is not confidently ascertained.

Item search application 118 may generate a network page that lists at least a portion of the pool of items. The network page may include varying levels of detail regarding the items. Where a particular category 133 has been identified, the network page may include features specific to that category 133. As a non-limiting example, where the category 133 comprises books, the list of items may be rendered within the network page as a row of images of book covers. As another non-limiting example, where the category 133 comprises apparel, the network page may include multiple views of each item in various colors and fabrics and/or other apparel-specific features. In some embodiments, search form fields may be included in the generated network page based on possible refinements 136 associated with the category 133, thereby enhancing the search experience within that category 133. The network page may also include form fields enabling the user to broaden the scope of the item search.

When no confidence score meets the threshold, the network page may include a disambiguation tool that provides a user interface for selecting one category 133 from several categories 133 that have been identified but are associated with relatively low confidence scores. The user may then be able to specify a category 133 in order to make the item search more specific. In such a case, refinements 136 that have been identified for the selected category 133 from the initial search query may be used in selecting a pool of items from the selected category 133. In one embodiment, the disambiguation tool may comprise a list of category 133 titles that are links. In another embodiment, the disambiguation tool may comprise a grouping of images that are associated with respective categories 133. The images may be selectable by the user through the browser 139. A disambiguation tool may also be provided when one or more categories 133 have high confidence scores in order to allow the user to "opt out" of an automatic selection of a category 133, to choose between multiple high confidence categories 133, and/or for other reasons.

In various embodiments, when a user selects an item from the network page containing the search results, a detailed network page providing detailed information about the item may be sent to the browser 139. When the user has included specific refinements 136 within a search query, the item search application 118 may be configured to preselect attributes for the item using the identified refinements 136. As a non-limiting example, when a user has searched for "maroon sweater," a detailed network page for a specific sweater may have a preselected color of red, while the default preselected color for that item may be green. A discussion of several non-limiting examples of network pages generated by the item search application 118 now follows.

Figure 2:
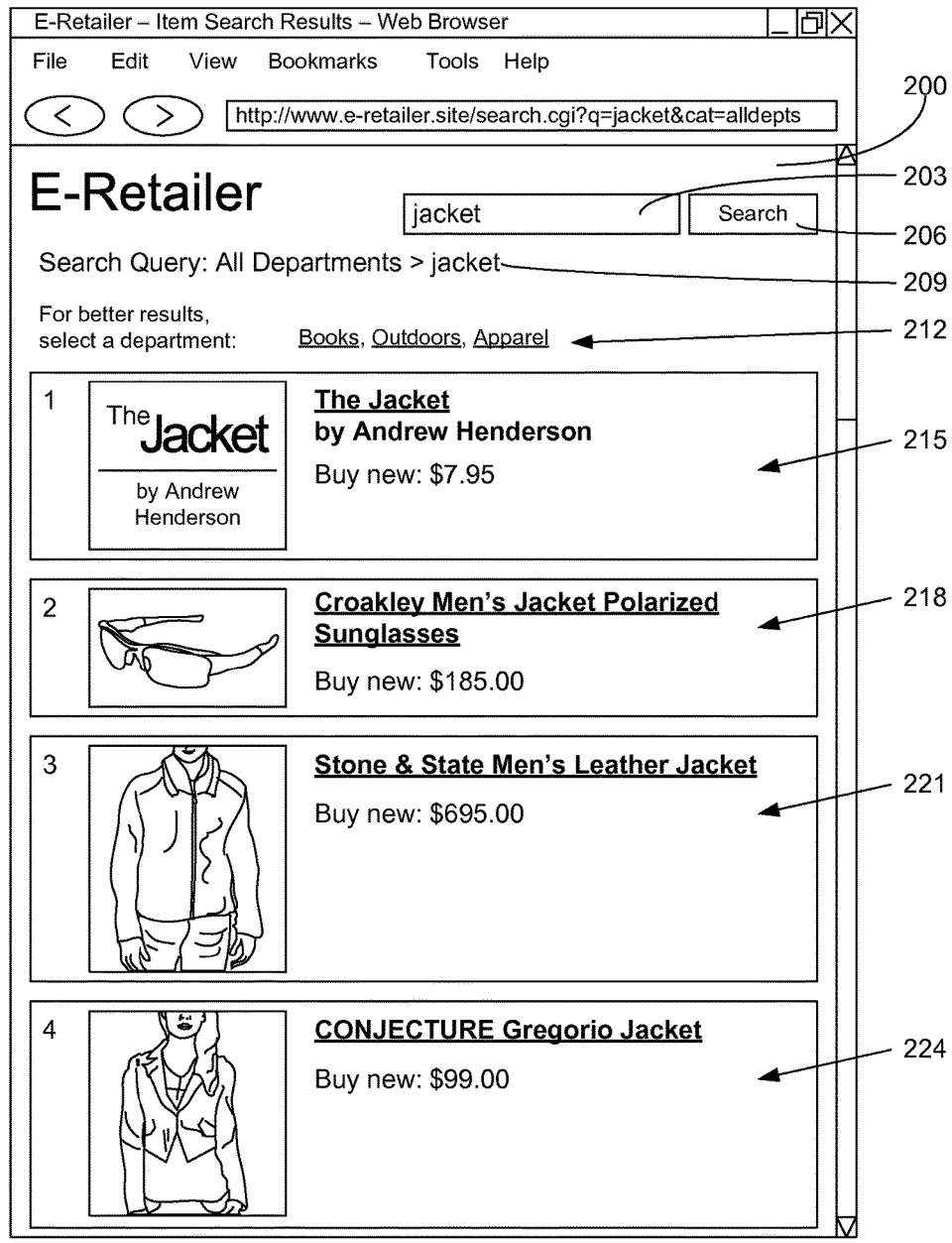
FIGS. 2-5 are drawings of examples of user interfaces rendered by a client in the networked environment of FIG. 1 according to various embodiments of the present disclosure.

Referring next to FIG. 2, shown is one example of a user interface rendered by a browser 139 executing in a client 106 (FIG. 1) in the networked environment 100 (FIG. 1) according to various embodiments of the present disclosure. Specifically, FIG. 2 depicts a network page 200 generated by the item search application 118 (FIG. 1) in response to the search query 203 of "jacket." The network page 200 displays the search query 203 adjacent to a search button 206 so that the user may refine the search query 203 if desired and execute a subsequent search. The network page 200 displays a search field summary 209, which in this case indicates that the search query 203 of "jacket" was searched for in "All Departments," i.e., the entire collection of items 124 (FIG. 1).

In the non-limiting example of FIG. 2, no identified category 133 (FIG. 1) had a confidence score meeting or exceeding the predetermined threshold. The search query 203 of "jacket" may be associated with items in many different categories 133, but each of the categories 133 is associated with a relatively low confidence score (i.e., not meeting or exceeding the predetermined threshold). Accordingly, a disambiguation tool 212 is rendered in the network page 200. The disambiguation tool 212 permits the user to select a specific category 133 out of multiple categories 133 that have been identified for the search query 203. In this specific case, the categories 133 of books, outdoors, and apparel have been identified. Each of the selectable categories 133 shown in FIG. 2 is displayed as a text link in the disambiguation tool 212. In other embodiments, an image or some other indicia of the category 133 may be provided.

The network page 200 includes search results 215, 218, 221, 224. The search result 215 is a book entitled "The Jacket." The search result 215 may be highly ranked within the pool of items because, for example, the title of the item, "The Jacket," includes search query 203. Search result 218 is associated with the outdoors category 133 and is a pair of sunglasses. Again, search query 203 is included in the title of the item. Search results 221 and 224 are each associated with the apparel category 133 and both include search query 203 within the title of the respective item.

Figure 3:
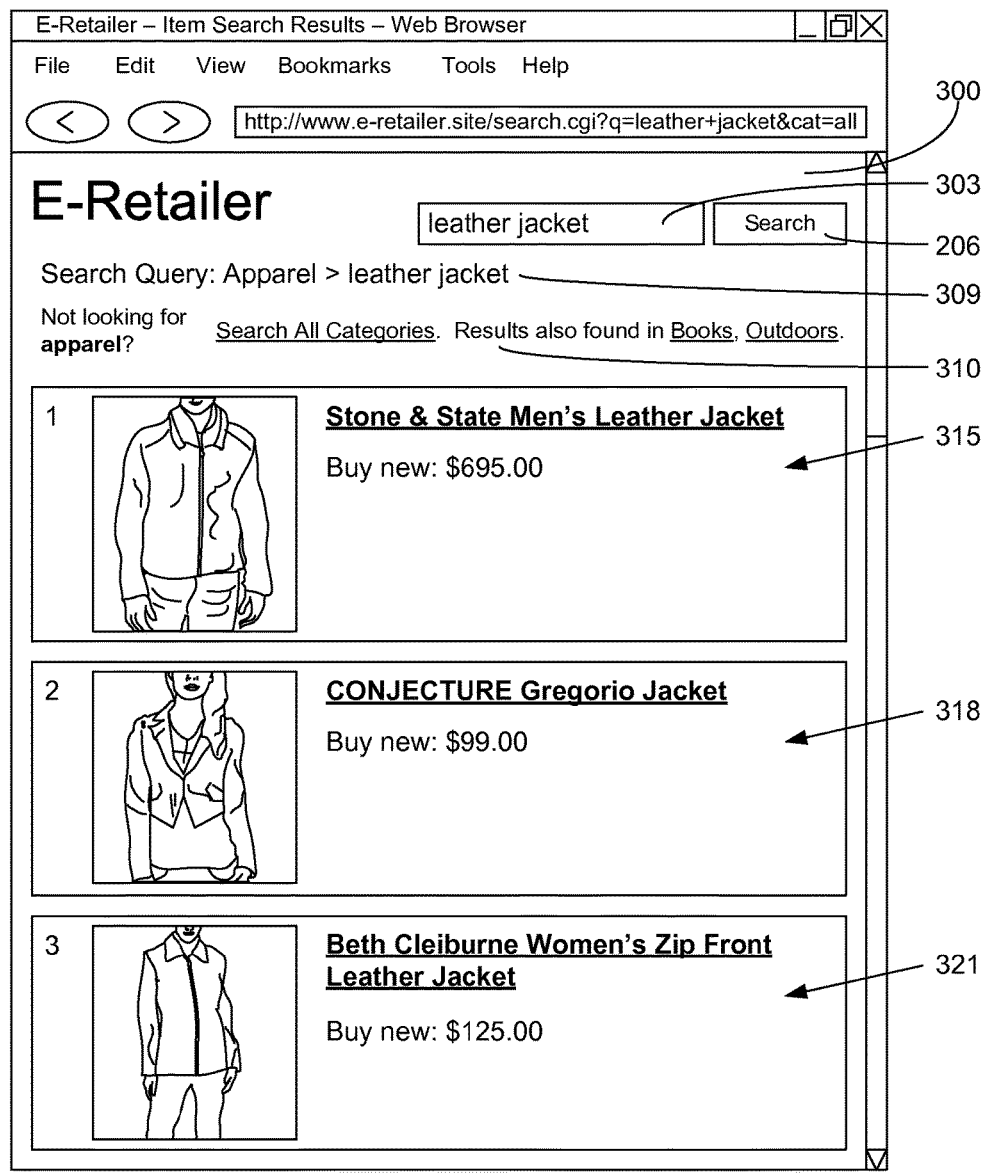

Moving on to FIG. 3, shown is another example of a user interface rendered by a browser 139 executing in a client 106 (FIG. 1) in the networked environment 100 (FIG. 1) according to various embodiments of the present disclosure. Specifically, FIG. 3 depicts a network page 300 generated by the item search application 118 (FIG. 1) in response to a search query 303 of "leather jacket." The search field summary 309 shows that the search was performed within the identified "apparel" category 133 (FIG. 1). In this non-limiting example, the identification of the category 133 of apparel had a relatively high confidence score because the search query 303 includes the additional term "leather." It may be the case that the items from the other categories 133 (i.e., books and outdoors) were not associated with the keyword "leather." Alternatively, "leather" may be considered as a refinement term 136 (FIG. 1) within the apparel category 133. In one embodiment, the apparel category 133 may include a category 133 of jackets as a subcategory, to which leather is an identified refinement 136.

The network page 300 may include a disambiguation tool 310. Even though the apparel category 133 may be identified with high confidence, the disambiguation tool 310 provides the user with an opportunity to "opt out" of an automatic category 133 determination. To this end, the disambiguation tool 310 may include a "Search All Categories" link to enable the user to search within all categories 133. The disambiguation tool 310 may also include links to other identified categories 133 (e.g., "Books" and "Outdoors") so that the user may select one or more different categories 133 if desired.

The network page 300 includes search results 315, 318, 321. The search results 315, 318, 321 are selected from the apparel category 133. Search results 315 and 321 were identified because each item includes both of the search terms from the search query 303 ("leather" and "jacket") within the respective item titles. Search result 318 does not include the term "leather" within the item title. However, search result 318 is displayed in network page 300 because, for example, search result 318 may have the term "leather" as an attribute, which may be searchable by the item search application 118 through metadata associated with the respective item. For instance, the term "leather" may be contained within the description of the item, and the item search application 118 may be configured to search terms contained within the title and description of an item.

Figure 4:
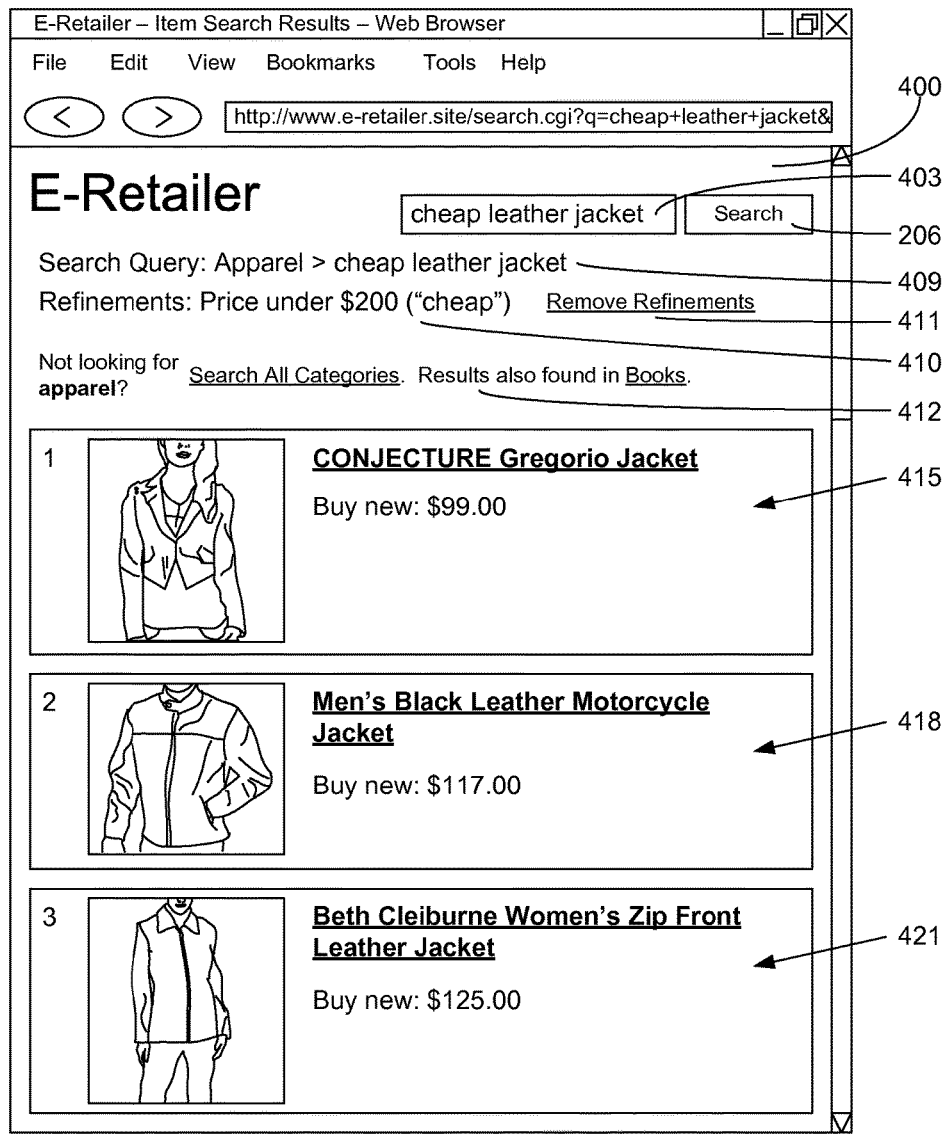

Referring next to FIG. 4, shown is another example of a user interface rendered by a browser 139 executing in a client 106 (FIG. 1) in the networked environment 100 (FIG. 1) according to various embodiments of the present disclosure. Specifically, FIG. 4 illustrates a network page 400 generated by the item search application 118 (FIG. 1) including the search results associated with the search query 403 of "cheap leather jacket." The search field summary 409 displays that the "apparel" category 133 (FIG. 1) was searched for items associated with search query 403, and specifically was searched for "cheap leather jackets." Additionally, one refinement 136 (FIG. 1) was identified according to the refinements summary 410. In this case, the item search application 118 has translated the search term "cheap" in search query 403 into a price refinement 136, limiting search results to items priced under $200. Such a refinement 136 may be associated, for example, with the category 133 of jackets, apparel, leather jackets or some other category 133.

A remove refinements link 411 may be provided to remove or modify identified refinements 136 as desired by the user. Like network page 300 (FIG. 3), network page 400 may also include a disambiguation tool 412. In the illustrated embodiment, the disambiguation tool 412 includes a different list of links to select identified categories 133 because of the different search query 403.

Search results 415, 418, 421 are provided in the network page 400. All of the search results 415, 418, 421 include the search terms "leather" and "jacket" within the item title and/or other data associated with the item. Further, search results 415, 418, 421 are each priced under $200 as specified by the refinement 136 identified in refinement summary 410.

Figure 5:

Turning now to FIG. 5, shown is another example of a user interface rendered by a browser 139 executing in a client 106 (FIG. 1) in the networked environment 100 (FIG. 1) according to various embodiments of the present disclosure. Specifically, a network page 500 is generated by the item search application 118 (FIG. 1) in response to the search query 503 of "leather jacket." As illustrated, the search field summary 509 differs from the search field summary 309 of network page 300 in FIG. 3, even though the search query 503 is identical to the search query 303 in FIG. 3. In particular, an "apparel/men's" category 133 (FIG. 1) has been identified and searched.

Like network page 300 (FIG. 3) and network page 400 (FIG. 4), network page 500 may also include a disambiguation tool 510. In the illustrated embodiment, the disambiguation tool 510 allows the user to search within the entire "apparel" category 133 instead of the identified "apparel/men's" category 133. The disambiguation tool 510 may also allow the user to search within all categories 133 or within other identified categories 133.

In FIG. 5, the item search application 118 has identified a specific user at the browser 139. In response to the identification, the network page 500 also includes a greeting 521 welcoming back a user named "George." The user identification may be performed by the item search application 118 based on user profile data 127 (FIG. 1). Because the user has been identified, the "apparel" category 133 may be further filtered for men's leather jackets. In one embodiment, a subcategory of "apparel" specifically associated with men's apparel may be used. In another embodiment, an additional gender refinement 136 (FIG. 1) may be identified based on the user profile data 127 associated with the specific user of the browser 139. The selection of leather jackets for men may be based, for example, on the purchase history of the user, the item viewing history of the user, characteristics identified to the user, and/or other data.

Figure 6:
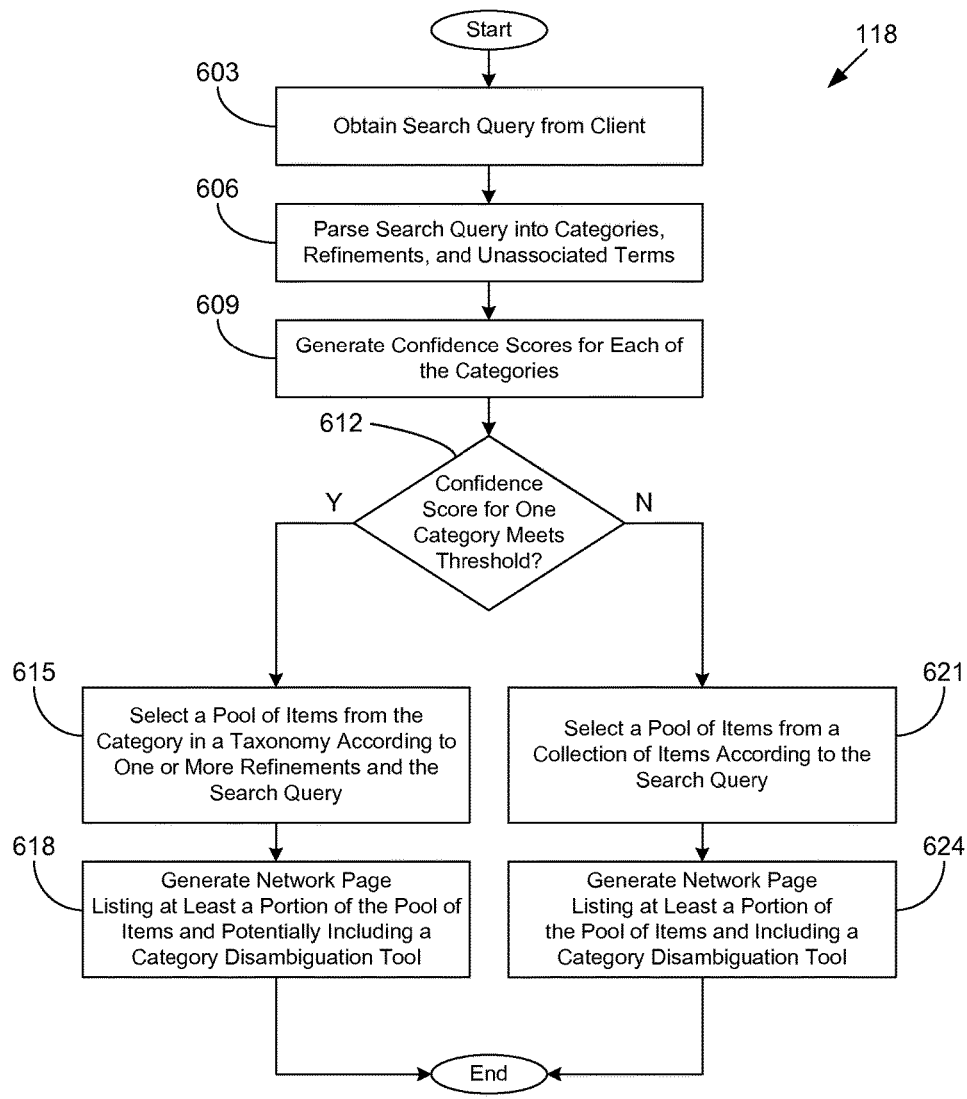
FIG. 6 is a flowchart illustrating one example of functionality implemented as portions of an item search application executed in a computing resource in the networked environment of FIG. 1 according to various embodiments of the present disclosure.

Referring next to FIG. 6, shown is a flowchart that provides one example of the operation of a portion of the item search application 118 according to various embodiments. It is understood that the flowchart of FIG. 6 provides merely an example of the many different types of functional arrangements that may be employed to implement the operation of the portion of the item search application 118 as described herein. As an alternative, the flowchart of FIG. 6 may be viewed as depicting an example of steps of a method implemented in the computing resource 103 (FIG. 1) according to one or more embodiments.

Beginning with box 603, the item search application 118 obtains a search query from a client 106 (FIG. 1). In various embodiments, the search query may be a character string containing one or more search terms or keywords and may be an unstructured query. In box 606, the item search application 118 parses the search query into keywords identified as categories 133 (FIG. 1), refinements 136 (FIG. 1), and/or unassociated search terms. Each of the search terms in the search query may be identified with one or more categories 133 and one or more refinements 136. Such identifications of categories 133 and refinements 136 are tentative based on a matching of the search terms within data associated with the respective categories 133 and refinements 136.

In box 609, the item search application 118 generates confidence scores for each of the categories 133 that have been identified from the search query. The confidence scores may be based at least in part on a matching of at least a portion of the search query to data associated with the respective category 133. The confidence score for a category 133 may also be based as least in part on an identification of a refinement 136 within the search query, where the refinement 136 is associated with the respective category 133. The confidence scores may be based at least in part on user profile data 127 (FIG. 1), aggregate user behavior data 130 (FIG. 1), and/or other data. In box 612, for each identified category, the item search application 118 determines whether a confidence score for the particular category 133 meets or exceeds a threshold.

In box 612, the item search application 118 determines whether a confidence score for one category 133 meets a threshold. If, in box 612, the item search application 118 determines that the confidence score for one category 133 meets or exceeds the threshold, the item search application 118, in box 615, selects a pool of items from the category 133 and the taxonomy 121 (FIG. 1) according to one or more identified refinements 136 and the text of the search query. The pool of items comprises at least one item. In box 618, the item search application 118 generates a network page providing at least a portion of the items selected in box 615.

The network page potentially may include a category disambiguation tool 310 (FIG. 3) to permit a user to opt out of an automatic determination of a category 133. The category disambiguation tool 310 may also allow a user to select another identified category 133 or to search within all categories 133. Thereafter, the item search application 118 ends.

If, instead, in box 612, the item search application 118 determines that no confidence score for any category 133 meets or exceeds the threshold, the item search application 118, in box 621, selects a pool of items from a collection of items 124 (FIG. 1) according to the search query. In box 624, the item search application 118 generates a network page providing at least a portion of the selected items and includes a category disambiguation tool 212 (FIG. 2). As discussed above, category disambiguation tool 212 permits a user to select one category 133 from the categories 133 that were initially identified by the item search application 118 but were associated with relatively low confidence scores. Alternatively, a category disambiguation tool 310 (FIG. 3) may allow a user to select among categories 133 associated with high confidence scores when more than one category 133 has a high confidence score. The category disambiguation tool 310 may also allow a user to search within all categories 133. Thereafter, the item search application 118 ends.

Figure 7:
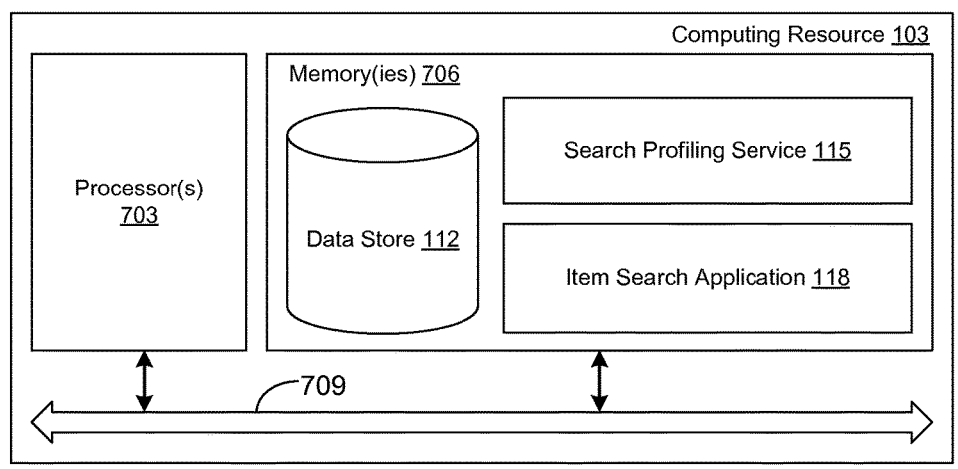
FIG. 7 is a schematic block diagram that provides one example illustration of a computing resource employed in the networked environment of FIG. 1 according to various embodiments of the present disclosure.

With reference to FIG. 7, shown is a schematic block diagram of the computing resource 103 according to an embodiment of the present disclosure. The computing resource 103 includes at least one processor circuit, for example, having a processor 703 and a memory 706, both of which are coupled to a local interface 709. To this end, the computing resource 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are search profiling service 115, the item search application 118, and potentially other applications. Also stored in the memory 706 may be a data store 112 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although search profiling service 115, the item search application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 6 shows the functionality and operation of an implementation of portions of the item search application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search profiling service 115 and the item search application 118, that comprises software or code can be embodied in any computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing a program executable in a computing device, wherein when executed the program causes the computing device to at least:
   obtain an unstructured search query from a client;
   identify at least one category according to the unstructured search query, each of the at least one category being in a taxonomy of a catalog of products;
   generate a confidence score for each of the at least one category based at least in part on a matching of at least a portion of the unstructured search query to data associated with the respective category, and an identification of at least one refinement in the unstructured search query that is associated with the respective category, the confidence score being generated using a weighted combination of a plurality of factors, a first factor of the plurality of factors comprising a quality of text match of the data associated with the respective category with the unstructured search query and a second factor of the plurality of factors comprising a number of refinements identified in the unstructured search query that are associated with the respective category, and the data associated with the respective category comprising a description of the respective category, and the quality of text match being based at least in part on a frequency that the at least a portion of the unstructured search query occurs within the description;
   identify the at least one refinement by translating at least one keyword from the unstructured search query into at least one criterion for selecting products from the respective category, wherein the translation is configured to translate a plurality of synonyms into the at least one criterion;
   select a first pool of products from the respective category according to the at least one refinement when the respective confidence score meets a threshold and no other confidence score meets the threshold;
   select a second pool of products from the catalog of products when no confidence score meets the threshold or when a plurality of the confidence scores meet the threshold; and
   generate a network page listing at least a portion of the first or second pool of products that has been selected, the network page including a disambiguation tool when no confidence score meets the threshold, the disambiguation tool providing a user interface for selecting one category from the at least one category.

2. The non-transitory computer-readable medium of claim 1, wherein the confidence score is further generated based at least in part on user profile data and aggregate user behavior data.

3. The non-transitory computer-readable medium of claim 1, wherein, when executed, the program further causes the computing device to at least parse the unstructured search query into a plurality of terms.

4. The non-transitory computer-readable medium of claim 3, wherein the at least one category is identified according to at least one of the plurality of terms.

5. A system, comprising:
   at least one computing device; and
   an item search application executable in the at least one computing device, wherein when executed the item search application causes the at least one computing device to at least:
     parse an unstructured search query to identify at least one category of a taxonomy of a collection of items
     generate a confidence score for each of the at least one category, each of the at least one category being associated with a confidence score, the confidence score being generated using a weighted combination of a plurality of factors, a first factor of the plurality of factors comprising a quality of text match of items in a respective category with the unstructured search query and a second factor of the plurality of factors comprising a number of refinements identified in the unstructured search query that are associated with the respective category, and data associated with the respective category comprising a description of the respective category, and the quality of text match being based at least in part on a frequency that at least a portion of the unstructured search query occurs within the description;

identify at least one refinement from the unstructured search query by translating at least one keyword from the unstructured search query into at least one criterion for selecting items from the respective category of the at least one category, wherein the translation is configured to translate a plurality of synonyms into the at least one criterion;

applying the at least one refinement to select a first pool of items from the respective category when the confidence score meets a threshold;

applying the at least one refinement to select a second pool of items from the collection of items when no confidence score meets the threshold; and generate a network page listing at least a portion of the first or second pool of items that has been selected, the network page including a disambiguation tool when no confidence score meets the threshold, the disambiguation tool providing a user interface for selecting one category from the at least one category.

6. The system of claim 5, wherein selecting the first pool of items from the respective category further comprises selecting the first pool of items from the respective category when no other confidence score meets the threshold, and wherein when executed the item search application further causes the at least one computing device to select the second pool of items from the collection of items when a plurality of the confidence scores meet the threshold.

7. The system of claim 5, wherein selecting the first pool of items from the respective category further comprises selecting the first pool of items based at least in part on a matching of text from the unstructured search query with text describing at least one item from the respective category.

8. The system of claim 5, wherein the at least one refinement comprises an attribute value associated with at least one item from the respective category.

9. The system of claim 5, wherein the at least one criterion comprises an attribute and an attribute value associated with the attribute.

10. The system of claim 5, wherein when executed the item search application further causes the at least one computing device to at least generate the confidence score for the respective category based at least in part on the at least one refinement.

11. The system of claim 5, wherein when executed the item search application further causes the at least one computing device to at least match text from the unstructured search query with the data describing the respective category.

12. The system of claim 5, wherein when executed the item search application further causes the at least one computing device to at least generate the confidence score for the respective category based at least in part on user profile data.

13. The system of claim 5, wherein the network page includes a link to a detailed network page for an item from the first or second pool of items that has been selected, the detailed network page preselecting at least one attribute for the item according to a refinement identified from the unstructured search query.

14. A method, comprising:
identifying, in at least one computing device, a plurality of categories in a taxonomy of a collection of items by matching at least one term in a user-provided unstructured search query with metadata associated with respective categories in the taxonomy;

identifying, in the at least one computing device, a refinement in the user-provided unstructured search query that is associated with at least one of the plurality of categories by translating at least one keyword from the user-provided unstructured search query into at least one criterion for selecting items from the at least one of the plurality of categories, wherein the translation is configured to translate a plurality of synonyms into the at least one criterion;

generating, in the at least one computing device, a confidence score for individual categories of the plurality of categories based at least in part on a matching of at least a portion of the user-provided unstructured search query with data associated with the individual categories of the plurality of categories, individual confidence scores being generated using a weighted combination of a plurality of factors, a first factor of the plurality of factors comprising a quality of text match of items in a respective category with the user-provided unstructured search query and a second factor of the plurality of factors comprising a number of refinements identified in the user-provided unstructured search query that are associated with the respective category, and the data associated with the respective category comprising a description of the respective category, and the quality of text match being based at least in part on a frequency that the at least a portion of the user-provided unstructured search query occurs within the description;

selecting, in the at least one computing device, a first pool of items from the one of the plurality of categories when the respective confidence score meets a threshold;

selecting, in the at least one computing device, a second pool of items from the collection of items when no confidence score meets the threshold; and generating, in the at least one computing device, a network page listing at least a portion of the first pool of items or the second pool of items that has been selected, the network page including a disambiguation tool when no confidence score meets the threshold, and the disambiguation tool providing a user interface for selecting one category from the plurality of categories.

15. The method of claim 14, wherein the user-provided unstructured search query is a character string comprising a plurality of search terms.

16. The method of claim 14, wherein selecting the first pool of items from the one of the plurality of categories further comprises selecting the first pool of items from the individual categories when the respective confidence score meets the threshold and the respective confidence score is a maximum one of the confidence scores.

17. The method of claim 14, wherein selecting the first pool of items from the one of the plurality of categories further comprises selecting the first pool of items from the respective category when the respective confidence score meets the threshold and no other confidence score meets the threshold, and the method further comprises selecting the second pool of items from the collection of items when a plurality of the confidence scores meet the threshold.

18. The method of claim 14, wherein the respective confidence score is generated based at least in part on whether the refinement is associated with the respective category.

19. The method of claim 14, wherein the first pool of items is selected from the respective category according to the refinement.

20. The method of claim 14, wherein the user-provided unstructured search query comprises at least one search term that is unassociated with the plurality of categories or the refinement.

21. The method of claim 14, further comprising:
   receiving, in the at least one computing device, the user-provided unstructured search query from a client device; and
   parsing, in the at least one computing device, the user-provided unstructured search query to identify the at least one term.

* * * * *